Nov. 10, 1964   R. ANTRAIGUE   3,156,504
WHEEL BALANCING MEANS
Filed Aug. 28, 1962   2 Sheets-Sheet 1
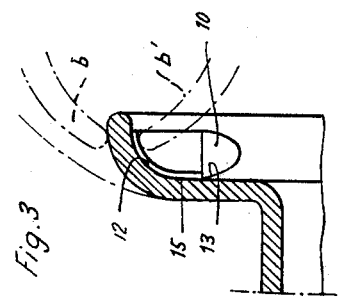
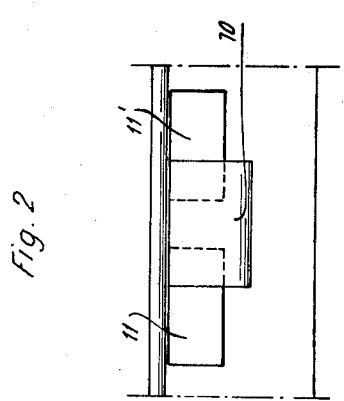
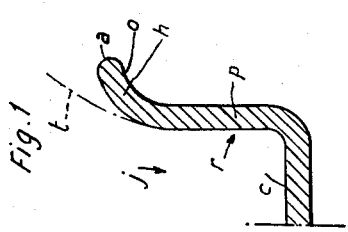
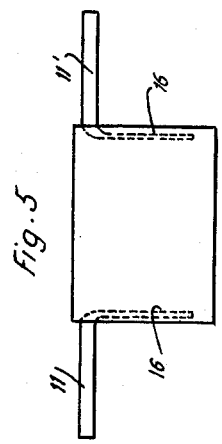
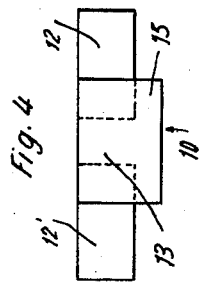
INVENTOR
ROGER ANTRAIGUE
BY
ATTORNEY Nov. 10, 1964   R. ANTRAIGUE   3,156,504
WHEEL BALANCING MEANS
Filed Aug. 28, 1962   2 Sheets-Sheet 2

INVENTOR
ROGER ANTRAIGUE
BY
ATTORNEY

United States Patent Office

3,156,504
Patented Nov. 10, 1964

3,156,504
WHEEL BALANCING MEANS
Roger Antraigue, 202 Quai de Jemmapes,
Paris 10, France
Filed Aug. 28, 1962, Ser. No. 219,861
3 Claims. (Cl. 301—5)

This application is a continuation-in-part of my U.S. application Serial No. 662,402 filed May 29, 1957, now abandoned.

The present invention relates to the balancing of automotive vehicle wheels.

It has already been proposed to balance a wheel of an automotive vehicle by placing a balancing weight on the outer face of the wheel rim at a suitable peripheral location.

It has been proposed for this purpose to place a small pouch filled with a heavy substance, such as a block of lead, on a cylindrical portion of the rim, on that face which is vertically below that against which the tire bead is fitted, the fixation of the said block of lead being carried out by means of spot welds between lugs formed on the pouch and the said cylindrical portion. But, besides the fact that it is necessary to provide a special shape of pouch for each weight value of the balancing mass, the installation of the device can be effected only after removal of the tire, inasmuch as the execution of a spot weld entails the provision of welding members, for example the ends of the arms of a welding gun, which are applied on each side of the parts to be welded.

A balancing device has also been proposed which consists of a balancing mass or weight of lead or the like and of lugs which are integral with said mass, said lugs extending on each side of said mass and being partially embedded in the interior of this latter, the attachment of the device to the wheel rim being effected over a substantially vertical portion thereof opposite the side which adjoins the side wall of the tire bead, with the result that in this case, also, the execution of the spot welds needed for the fixation makes it necessary for the tire to be removed from the rim beforehand.

In point of fact, in order to balance the wheel of an automotive vehicle in an accurate and reliable manner, the balancing device would have to be fitted with the tire already in position on the rim since otherwise the removal and refitting of the tire would be liable to give rise in the wheel to different conditions of balance as compared with a condition previously determined which had governed the choice of the balancing weight and/or the choice of the position of said weight, and the result sought would accordingly not be achieved.

One object of the present invention is to provide a balancing device which can be fitted on the wheel of an automobile vehicle by means of spot welds, thereby making profitable use of the advantages attendant upon this mode of fixation, yet which does not entail the prior removal of the tire from the rim.

A further object of the invention is to provide a device of this type in which the fitting in position of said device by the execution of spot welds is not liable to cause damage in any respect whatever to the tire which is left on the rim.

A still further object of the invention is to provide a device of this type which is not liable to be damaged after being fitted in position, as a result of impacts of a wheel thus fitted with said device against the curbs of sidewalks and the like.

Another object of the invention is to provide a device of this type which can be placed not only on the external portion of a wheel but also on the internal portion thereof and which is accordingly suitable for the so-called "dynamic" balancing of the wheel.

Yet another object of the invention is to provide a device of this type which makes it possible to compensate the unbalance of a wheel even if that unbalance is of a very high order.

In accordance with the invention, the lateral lugs with which the balancing weight proper is made integral are so shaped that they can be housed in immediate proximity to the edge of the external curved portion or horn of the rim so that it is possible to fix said lugs thereon by means of one or more spot welds effected by a welding gun, one arm of which applies the lug against the inner face of the rim flange while the other arm bears against the opposite outer face of said rim flange with which the tire is not in contact.

In the description which follows below and which is given solely by way of example without any limitation being implied, reference is made to the accompanying drawing, in which:

FIG. 1 shows a part of the cross-section of a vehicle-wheel rim;

FIG. 2 shows a device according to the invention, in frontal view, the corresponding portion of the rim being shown straight for simplicity of representation;

FIG. 3 is a cross-section of a rim equipped with the device shown in FIG. 2, the device being seen in side view;

FIG. 4 shows the device of FIG. 2 from its opposite face;

FIG. 5 shows another embodiment of a device according to the invention, in a view similar to FIG. 2;

Figure 6:
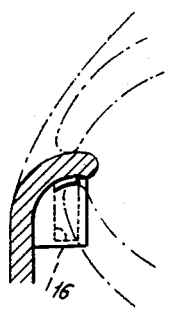
Figure 7:
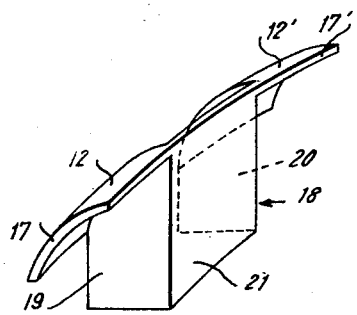
Figure 8:
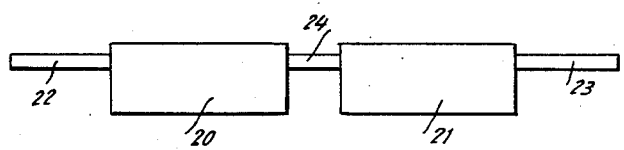

FIG. 6, in a view similar to FIG. 3, shows the embodiment of FIG. 5 during spot welding to the rim;

FIG. 7 is a perspective view of a device according to the invention constituting still another embodiment; and FIG. 8 is a frontal view of a further embodiment of a device according to the invention.

The wheel rim $j$ (as shown in FIG. 1) is provided in known manner, starting from its cylindrical portion $c$, with an axially extending lip flange $r$ which comprises a substantially flat or slightly frusto-conical portion $p$ and a slightly curved portion or horn $h$. The profile of the tire has been represented by the chain-dotted line $t$.

The device in accordance with the invention comprises, in the embodiment shown in FIGS. 2 to 4, a balancing weight 10 proper and, on each side of this mass, lateral lugs 11 and 11'. The lugs 11 and 11', which are cut out from a metallic ribbon, are shaped or capable of being shaped in such manner that their inner faces 12 and 12' hug the exposed annular face $o$ on the concave side of the rim horn $h$ in the curved portion of this latter and close to the tip $a$ of the horn in that portion of the wheel rim which is farthest away from the axis of the wheel. The inner face 13 of the weight proper 10 is also curved so as to correspond to the external convex profile of the rim flange. As a rule, the height of the balancing weight is sufficient to ensure that, beyond the curved portion 13, the weight has a substantially flat portion 15 which closely corresponds to the shape of the portion $p$ of the rim flange. The height of the lugs 12 and 12' need not, on the other hand, be so great as the height of the balancing weight proper, although in certain embodiments provision can be made for lugs which have substantially the same height as the balancing weight proper.

The rigid attachment of the lugs 11 and 11' to the weight 10 can be carried into effect in any appropriate manner, for example by placing one portion of each lug inside the mold which is provided for casting the metal, this metal being usually lead or a low-melting lead alloy; accordingly, after pouring and setting, the lugs are firmly anchored in the balancing mass or weight.

The said lugs can simply extend inside the balancing weight or alternatively, as shown in FIGS. 5 and 6, they can be bent down in the shape of wings 16 and 16' so as to improve the fixing. In this embodiment, the weight is of virtually prismatic shape and the height of the lugs is small as compared with the previous embodiment.

As an additional feature, the lugs can also be made structurally integral wth each other. FIG. 7 accordingly shows lugs 17 and 17' which are connected together through the intermediary of a link 18 which is provided with cheeks 19 and 20 as well as a front face 21, the complete unit being producible by cutting out and cambering a metallic sheet. In this case, the cheeks 19 and 20 as well as the front face 21 are embedded in the balancing mass proper and strengthen this latter. The cheeks 19, 20 as well as the front face 21 may also substantially correspond in shape to the external contour of the cheeks 19, 20 and the front face 21 can even be made flush with the surface of the balancing weight proper.

In all the embodiments which are contemplated, the device is fitted into position as follows: the said device is brought into a suitable peripheral position from an angular point of view—this position having been previously determined if necessary by means of known apparatus—and a welding gun having arms $b$ and $b'$ (FIG. 3) is placed in such manner that the arm $b'$ thereof applies the curved portion of one lug against the rim horn while the other arm $b$ is forcibly applied against the inner face (which is the top face in FIGS. 3 and 6) of the rim horn $h$, this portion being accessible in spite of the presence of the tire $t$ as is clearly shown in these figures. One or several spot welds are accordingly performed on each lug, thereby effecting the fixation thereof. The wheel can thus be balanced without removal of the tire. If it should subsequently be desired to remove the balancing device, for example after fitting another tire to the rim, it is merely necessary to deliver a blow with a chisel on each spot weld whose axis extends substantially radially of the wheel axis (see FIGS. 3 and 6) and which, being thus practically unaffected by centrifugal forces, may be made weak enough to permit such removal.

The balancing device is wholly contained inside the concavity of the rim horn, being thus protected from impacts against the curbs of sidewalks or the like.

The configuration of the balancing device enables this latter to be fitted not only against the external portion of the wheel rim as illustrated in the drawing, but also against the internal portion, despite the presence of the brake drum.

There has been shown in FIG. 8 a balancing device consisting of two balancing weights 20 and 21 with end lugs 22 and 23 and an intermediate strip 24. The fitting of the device is carried out by making spot welds both on the outer lugs 22 and 23 and on the intermediate lug 24. This device provides a means of compensating highly unbalanced weight distributions.

What I claim is:

1. In a tire-bearing vehicle wheel having a rim with an annular tire-bead-retaining flange extending radially outwardly with reference to the wheel axis, said flange curving arcuately away from the tire and terminating in a substantially axially extending lip, thereby defining a concave surface curving away from the tire and spanning an arc of approximately 90°, the combination of said rim with balancing means for said wheel comprising a weighted body and a pair of lateral lugs integral with said body, said lugs and said body having a convex side conforming to the curvature of said concave surface and contacting same throughout an area which includes a part of said radially extending bead-retaining flange as well as a substantial portion of said lip, said lugs being fastened to said lip close to the edge thereof by spot welds whose axes extend substantially radially of the wheel axis.

2. The combination defined in claim 1 wherein said lugs have wings imbedded in said body.

3. The combination defined in claim 1 wherein said lugs are integrally interconnected and form a retaining strap embracing said body.

References Cited in the file of this patent

UNITED STATES PATENTS

| | | |
|---|---|---|
| 2,049,918 | Marsh | Aug. 4, 1936 |
| 2,202,129 | Turner | May 28, 1940 |
| 2,300,700 | Porter et al. | Nov. 3, 1942 |
| 2,585,802 | Loewe | Feb. 12, 1953 |

FOREIGN PATENTS

| | | |
|---|---|---|
| 320,051 | Switzerland | Apr. 30, 1957 |
| 1,109,941 | France | Oct. 5, 1955 |
| 1,151,191 | France | Aug. 19, 1957 |